(12) United States Patent
Ertz

(10) Patent No.: US 8,060,281 B2
(45) Date of Patent: Nov. 15, 2011

(54) ACTIVE LOWER EXTREMITY CRASH PROTECTION SYSTEM

(75) Inventor: Jeffrey Ertz, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 619 days.

(21) Appl. No.: 12/185,251

(22) Filed: Aug. 4, 2008

(65) Prior Publication Data
US 2010/0030432 A1    Feb. 4, 2010

(51) Int. Cl.
*B60R 22/00* (2006.01)
(52) U.S. Cl. ............................ 701/45; 280/748; 180/274
(58) Field of Classification Search .................. 180/274, 180/282; 280/748, 750, 753; 701/45
See application file for complete search history.

(56) References Cited

U.S. PATENT DOCUMENTS

| | | | |
|---|---|---|---|
| 6,213,505 B1 * | 4/2001 | Van Wynsberghe et al. | 280/748 |
| 6,349,965 B1 * | 2/2002 | Heilig | 280/748 |
| 7,789,185 B2 * | 9/2010 | Eriksson et al. | 180/274 |
| 2005/0218641 A1 | 10/2005 | Tajima et al. | |
| 2008/0048423 A1 * | 2/2008 | Eriksson et al. | 280/748 |

FOREIGN PATENT DOCUMENTS

| | | |
|---|---|---|
| JP | 2002067866 | 3/2002 |
| JP | 2005280560 | 10/2005 |

* cited by examiner

*Primary Examiner* — Faye M. Fleming
(74) *Attorney, Agent, or Firm* — Mark E. Duell, Esq.; Emerson Thomson Bennett

(57) ABSTRACT

Some embodiments of the present invention relate to motor vehicle crash safety systems and related methods. More particularly, according to some embodiments, the lower extremities of a motor vehicle occupant can be positioned in preparation for a crash event. Some embodiments include means for sensing a crash event, and means for positioning the lower extremities of the occupant.

15 Claims, 1 Drawing Sheet

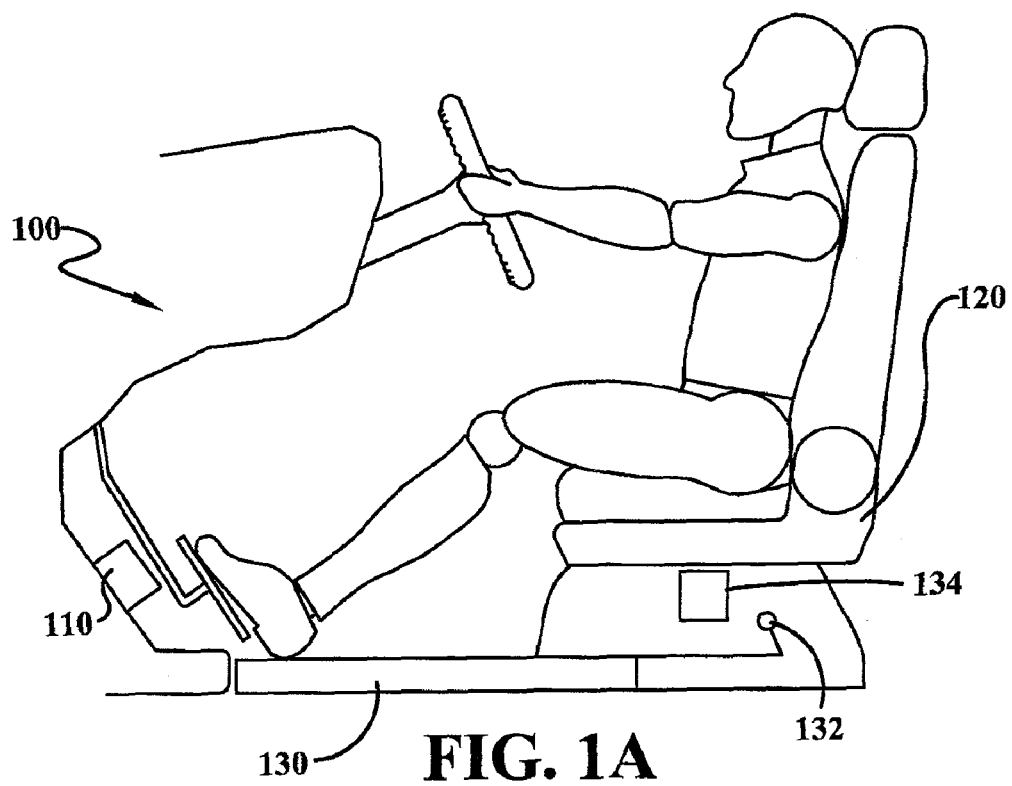
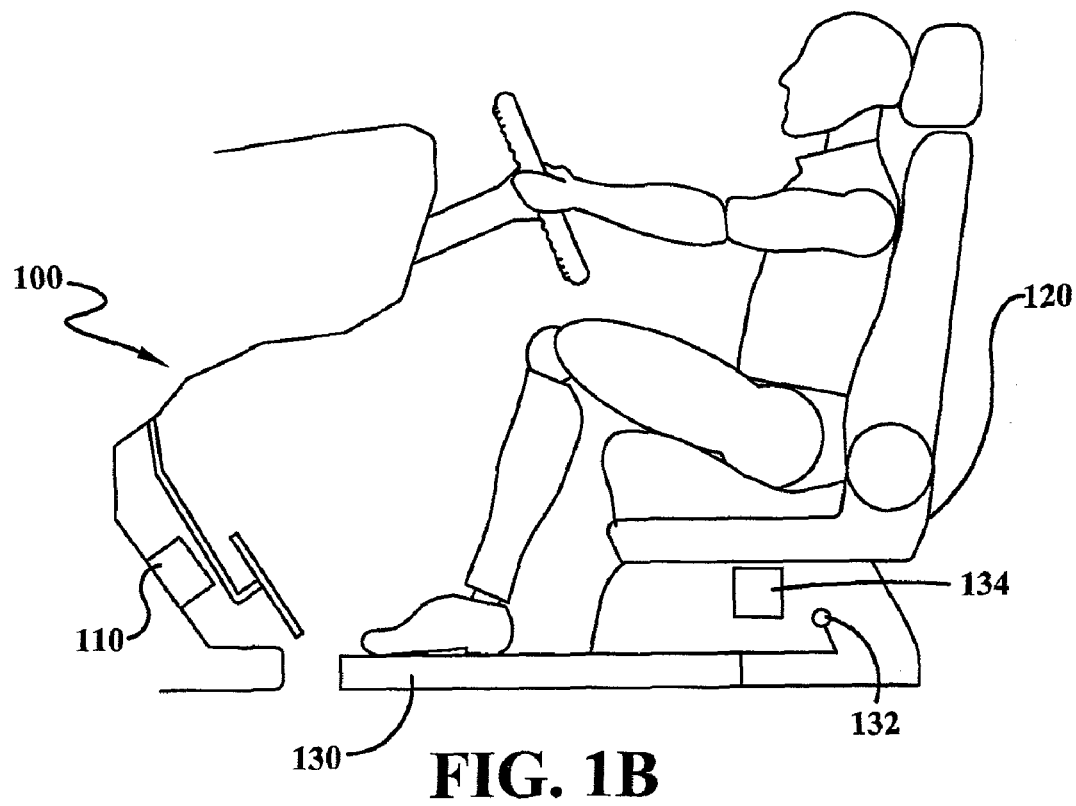

ACTIVE LOWER EXTREMITY CRASH PROTECTION SYSTEM

BACKGROUND OF THE INVENTION

A. Field of Invention

The present invention generally relates to devices and methods for vehicular occupant protection systems, and more particularly devices and methods for the active protection of an occupant's lower extremities.

B. Description of the Related Art

To increase a passenger's chances of surviving a frontal crash or collision, it is known to use both safety belt restraining systems as well as airbag systems.

Load management methods are also known for reducing injury and enhancing survivability. In general, load management entails using crumple zones. Crumple zones permit structural components of the automobile to deform in order to absorb the kinetic energy of a collision. It is known that in some frontal collisions, the space provided by the crumple zone is insufficient and components such as the vehicle engine and/or frame may be forced into the passenger compartment. This is known to cause injury especially to the lower extremities or legs of front seat occupants.

Knee bolsters are known in the automotive industry to aid in reducing the risk and severity of lower extremity injury during frontal collisions. Generally, knee bolsters comprise a yieldable lower wall of a dashboard, which are positioned to engage the knees of an occupant. Knee bolsters provide an energy-dissipating yieldable surface for restraining the passenger's lower extremities. Although knee bolsters absorb kinetic energy, their normal mode of operation still requires impact with the occupant, which produces injuries.

It is also known in the automobile industry to use knee air bags to reduce the risk of lower-extremity injury during a vehicle collision. A knee air bag may be upwardly deployed from below and in front of the occupant's legs. The bag inflates restraining the occupant's knees, absorbing kinetic energy, and preventing the lower body from moving forward into the vehicle's foot well area.

Despite these improvements, occupant safety remains an area of concern. During a frontal collision, a vehicle's foot well area can experience severe crash deformation. This foot well crash deformation, combined with the location and posture of an occupant's legs and feet, can contribute to the occurrence and severity of injury to a frontal occupant's lower extremities.

Existing devices and methods have various disadvantages. For example, they can be costly, add significant weight to the vehicle, and/or create comfort or ergonomic issues. Accordingly, there is a need in the art for devices and methods that offer improvements over the prior art.

BRIEF SUMMARY OF THE INVENTION

Some embodiments relate to a vehicle crash safety system, comprising: a crash-event sensor adapted to transmit a signal indicating detection of a crash event; a controller unit adapted to receive a signal indicating detection of crash event, and actuating a motion device in response to the signal; the motion device in electronic controlling communication with the controller unit; and a movable floor member in mechanical communication with the motion device and adapted to move in a rearward direction relative to an occupant of a vehicle, and adapted to support and position the feet of the occupant.

Other embodiments relate to a process for mitigating injury an occupant of a motor vehicle, comprising the steps of: sensing a crash event; signaling the occurrence of a crash event; receiving the signal indicating the occurrence of a crash event; moving a moveable floor member in response to receiving the signal, wherein the moveable floor member is adapted to position the feet of an occupant; and positioning the feet of an occupant in preparation for a crash event.

Still other embodiments relate to a vehicle crash safety system, comprising: a means for sensing a crash event; a means for signaling the occurrence of a crash event; a means for receiving the signal indicating the occurrence of a crash event; a means for moving a moveable floor member in response to receiving the signal, wherein the moveable floor member is adapted to position the feet of an occupant; and a means for positioning the feet of an occupant in preparation for a crash event.

BRIEF DESCRIPTION OF THE DRAWINGS

The invention may take physical form in certain parts and arrangement of parts, embodiments of which will be described in detail in this specification and illustrated in the accompanying drawings, wherein:

FIG. 1A is a side view of an embodiment prior to a crash event; and

FIG. 1B is a side view of an embodiment following a crash event.

DETAILED DESCRIPTION OF THE INVENTION

Some embodiments of the present invention are directed to an automotive active lower-extremity protection system (hereinafter referred as "the protection system" or "protection system") and related methods. According to some embodiments, the protection system comprises three basic components: a crash event sensor, a moveable floor member and a motion device. The sensor can be in electronic communication with the motion device or one or more motion device controllers. The motion device can be in mechanical communication with the moveable floor member such that the motion device can cause the floor member to move in a rearward direction relative to the vehicle. Accordingly, if an occupant's feet are resting on the moveable floor member when a crash event is sensed, then the floor member can position the occupant's feet in a location that is more advantageous during a crash event, and may avoid or mitigate injury to the lower extremities.

Crash event sensors can take any of a variety of forms, such as an accelerometer. According to some embodiments, appropriate sensors can comprise one or more existing Supplemental Restraint Sensors (SRS), such as that which is used in connection with airbag deployment. Furthermore, some embodiments can share a crash event sensor with an airbag deployment system. In some embodiments the sensor can comprise a wireless transmitter adapted to a transmit crash event detection signal to a device such as a diagnostic unit, computer and/or controller device. In other embodiments the sensor can comprise a hardwired electronic connection to one or more such devices.

Motion devices can also take a variety of forms. For example, in some embodiments the motion device can comprise a motorized track and rail system, cable and winch system, and/or a rotating arm having a linkage to the moveable floor member. In other embodiments the motion device can comprise an explosive charge adapted to propel a moveable floor member in a predetermined direction. Furthermore, in some embodiments a motion device can be combined with a controller device to form a single unit. A wide variety of means for moving a floor mat are known in the art, and are thus within the scope of the present invention.

The moveable floor member can comprise any of a wide variety of means for positioning an occupant's feet. For example, in some embodiment the moveable floor member can comprise a floor mat in mechanical communication with the motion device, wherein the floor mat is adapted to be slid along the floor of the vehicle by the motion device. In other embodiments, the moveable floor member can comprise a conveyor belt system comprising a belt in driving communication with at least one drive wheel. In still other embodiments, the moveable floor member can comprise a platform mounted on a track and rail system, wherein the platform is slideably moveable.

Moveable floor members can also comprise any of a wide variety of materials. Some particularly advantageous materials can include materials having relatively high coefficients of friction. For instance, elastomeric materials can appropriate in some embodiments.

In one embodiment a crash-event sensor is adapted to sense a frontal vehicular collision. When such a collision is sensed, the sensor generates a signal that results in actuating the motion device. The motion device then pulls the floor mat in a rearward direction. Thus, the occupant's feet are moved in a rearward direction, and the lower extremities are positioned away from the dash and forward cabin components.

With reference to the drawings, FIG. 1A shows an embodiment of protection system 100 before a crash takes place. When a crash-event sensor (CES) 100 detects a collision the CES 100 transmits a signal to motion-device controller 134, which is located under a vehicle seat 120. The motion device controller 134 actuates the motion device 132, which in turn causes the moveable floor member 130 to slide in a rearward direction. Further according to FIG. 1A, an electronic signal can be emitted by CES 100 at substantially the same time as the CES 100 senses a collision, or very shortly thereafter. Any known vehicular CES can be employed in protection system 100, and a person skilled in the art will be able to select a suitable CES without undo experimentation. One of skilled in the art can incorporate a particular CES into a vehicle and/or protection system 100 using known methods.

FIG. 1B shows an embodiment of the protection system after a crash has occurred. The occupant's feet have been shifted in a rearward direction by the sliding motion of moveable floor member 130.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A vehicle crash safety system, comprising:
   a crash-event sensor adapted to transmit a signal indicating detection of a crash event;
   a controller unit adapted to receive a signal indicating detection of crash event, and actuating a motion device in response to the signal;
   the motion device in electronic controlling communication with the controller unit; and
   a movable floor member that: (1) is in mechanical communication with the motion device; (2) is adapted, prior to the crash-event sensor sensing a crash event, to support the feet of an occupant of a vehicle; and, (3) is adapted, following the crash-event sensor sensing a crash event, to move in a rearward direction relative to the occupant, and thereby to move the feet of the occupant supported on the movable floor member in the rearward direction.

2. The system of claim 1, wherein the crash event sensor comprises an accelerometer.

3. The system of claim 1, wherein the crash event sensor is adapted to transmit the signal wirelessly.

4. The system of claim 1, wherein the crash event sensor is adapted to transmit the signal less than 50 milliseconds after detecting a crash event.

5. The system of claim 1, wherein the controller unit is adapted to actuate the motion device less than 50 milliseconds after detecting a crash event.

6. The system of claim 1, wherein the controller unit and the motion device comprise a single unit.

7. The system of claim 1, wherein the motion device comprises one or more of an electric motor, a track and rail system, a belt and drive system, or a slideable mat.

8. The system of claim 1, wherein the motion device is adapted to move the moveable floor member from a first position to a second position in less than 50 milliseconds.

9. The system of claim 1, wherein the moveable floor member is adapted to position the feet of the occupant in preparation for a crash event.

10. A process for mitigating injury an occupant of a motor vehicle, comprising the steps of:
    sensing a crash event;
    signaling the occurrence of a crash event;
    receiving the signal indicating the occurrence of a crash event;
    moving a moveable floor member in response to receiving the signal, wherein the moveable floor member is adapted to support the feet of an occupant of a vehicle prior to the sensing of a crash event and to move the feet of the occupant; and
    moving the feet of the occupant in preparation for a crash event.

11. The process of claim 10, wherein the step of sensing a crash event further comprises sensing deceleration.

12. The process of claim 10, wherein the step of signaling further comprises broadcasting a wireless signal.

13. The process of claim 10, wherein the step of receiving further comprises receiving a wireless signal.

14. The process of claim 10, wherein the step of moving further comprises sliding or rotating the moveable floor member.

15. A vehicle crash safety system, comprising:
    a means for sensing a crash event;
    a means for signaling the occurrence of a crash event;
    a means for receiving the signal indicating the occurrence of a crash event;
    a means for moving a moveable floor member in response to receiving the signal, wherein the moveable floor member is adapted to support the feet of an occupant of a vehicle prior to the sensing of a crash event and to move the feet of the occupant; and
    a means for moving the feet of the occupant in preparation for a crash event.

* * * * *